(12) United States Patent
Amann et al.

(10) Patent No.: US 7,680,738 B2
(45) Date of Patent: Mar. 16, 2010

(54) SYSTEM AND METHOD FOR EXECUTING CASH PAYMENTS VIA A COMPUTER NETWORK

(75) Inventors: Catherine L. Amann, Monroe, CT (US); Arthur Barnett, New York, NY (US); Jaromir G. Divilek, Bronx, NY (US); Garling Lee, Edison, NJ (US); Eric T. Nissenbaum, Norwood, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1677 days.

(21) Appl. No.: 09/982,350

(22) Filed: Oct. 16, 2001

(65) Prior Publication Data

US 2002/0062285 A1 May 23, 2002

Related U.S. Application Data

(60) Provisional application No. 60/252,641, filed on Nov. 22, 2000.

(51) Int. Cl.
*G06F 17/60* (2006.01)
(52) U.S. Cl. .................................... 705/43; 705/35
(58) Field of Classification Search .............. 705/43; 348/35–48, 408; 718/102
See application file for complete search history.

(56) References Cited

U.S. PATENT DOCUMENTS

| 4,321,672 | A | * | 3/1982 | Braun et al. ............... 705/42 |
| 4,864,497 | A | * | 9/1989 | Lowry et al. .............. 707/102 |
| 5,220,501 | A | * | 6/1993 | Lawlor et al. ............. 705/40 |
| 5,650,604 | A |   | 7/1997 | Marcous et al. |
| 5,937,396 | A |   | 8/1999 | Konya |
| 5,963,647 | A |   | 10/1999 | Downing et al. |
| 5,993,047 | A |   | 11/1999 | Novogrod et al. |
| 6,098,091 | A | * | 8/2000 | Kisor ...................... 709/202 |
| 6,119,931 | A |   | 9/2000 | Novogrod |
| 6,182,894 | B1 |  | 2/2001 | Hackett et al. |
| 6,292,789 | B1 | * | 9/2001 | Schutzer .................. 705/40 |

OTHER PUBLICATIONS

Antonella et al.; Introducing ATMs in INdia: a contextual inquiry; Nov. 3, 2003; Elsevier, 1-15.*

* cited by examiner

*Primary Examiner*—James P Trammell
*Assistant Examiner*—Marissa Liu
(74) *Attorney, Agent, or Firm*—Snell & Wilmer L.L.P.

(57) ABSTRACT

The invention presented comprises a system and method for executing a cash payment via a computer network. A payor computing device communicates over a computer network with payee computing devices via a P2P server. The P2P server is operative to receive a payment request from the payor computing device and process the payment by debiting a financial instrument specified by a payor utilizing the payor computing device. The payment request is transmitted from the P2P server to a cash payment server operative to receive the payment request and translate the request into the native format of an ATM control server, the native format of the P2P server and ATM control server not being interoperable. The ATM control server is operative to generate a PIN code, which is transmitted along with the received payment instructions to an ATM. The ATM receives the payment instructions and dispenses the payment upon receipt of the PIN code. Receipt data is also generated by the ATM control server, translated into the native format of the P2P server by the cash payment server, and delivered to the payor and payee via the P2P sever.

14 Claims, 7 Drawing Sheets

SYSTEM AND METHOD FOR EXECUTING CASH PAYMENTS VIA A COMPUTER NETWORK

Applicant(s) hereby claims the benefit of provisional patent application Ser. No. 60/252,641, titled "SYSTEM AND METHOD FOR CASH PAYMENTS OVER THE INTERNET VIA A CREDIT OR DEBIT INSTRUMENT," filed on Nov. 22, 2000. The application is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to systems and methods for transmitting instructions for cash payments. More particularly, the present invention relates to a system and method used to interface a computer system with an ATM system so that payment instructions may be freely routed between the disparate networks and protocols of the two systems.

Using current technology, it is possible to transmit a payment to an ATM or similar financial terminal or kiosk for receipt only by its intended recipient. An example of this type of technology is the Z-CASH™ system developed by WESTERN UNION™. Terminals equipped with software to support the Z-Cash standard or format are capable of electronic money transfers to and from any equipped ATM or Western Union money transfer outlet.

The Z-Cash system allows a consumer to electronically send money using any participating ATM by simply swiping an ATM card and selecting the money transfer option presented on the terminal's display device. The user is prompted to select a personalized code and the desired dollar amount to transfer. The sender relays the confirmation number and the personalized code to the intended recipient who can retrieve the finds from any participating ATM. No bankcard is required to retrieve the funds, just the confirmation number and personalization code, which provides a means for securing the transaction. An example of cardless transaction technology is presented in U.S. Pat. No. 6,045,039, entitled "Cardless Automated Teller Transactions", which is hereby incorporated by reference in its entirety.

FIG. 1 presents an illustration of the above-described system. A person wishing to make a payment 10, e.g., a payor, has two methods through which to make the payment: through the use of an ATM or similar terminal 20 or through interacting with a live agent 40 over a two way communication device such as a telephone. The ATM terminal 20 executes terminal software that allows the user to have a selected account debited by the payor's financial institution or instrument 25 and transmit the payment request, including confirmation number and personalization code, to an ATM terminal control server 50, e.g., a Western Union Z-Cash compliant server operative to control one or more ATM terminals 20, 80.

The terminal 20 forwards the payment request to the ATM control server 50, which is received and processed by ATM control software 60. The ATM control software 60 processes the payment request and transmits it to a destination terminal 80. The terminal software 90 receives and stores the request. The payor 10 coveys the confirmation number and personalization code to the intended recipient or payee 70. Once in possession of this information, the payee 70 inputs the confirmation number and personalization code into the terminal 80 where it is verified against the data received by the terminal software 90 from the ATM control server 50. If the data is verified, the currency is dispensed and the transaction concluded.

One limitation of a system such as this is its lack of support for systems not equipped to communicate according to the native format of the ATM system, e.g., the Z-Cash standard. There is thus a need for a system and method that allows users of computer systems, for example, P2P systems, to execute payments to other users that may be received by the intended recipient at an ATM or other similar financial terminal or kiosk communicating according to a native format that is different from that used by the computer system.

BRIEF SUMMARY OF THE INVENTION

The invention disclosed herein is a system and method for executing a cash payment from a computer network. The system disclosed herein comprises a payor computing device communicating over a computer network with payee computing devices via a P2P server. The P2P server is operative to receive a payment request from the payor computing device and process the payment by debiting a financial instrument specified by a payor utilizing the payor computing device. The payment request is transmitted in the native format of the P2P server to a cash payment server executing request translation software operative to receive the payment request and translate the request into the native format of an ATM control server; the native format of the P2P server and ATM control server not being interoperable. The ATM control server is operative to generate a PIN code, which is transmitted along with the received payment instructions to an ATM. The ATM receives the payment instructions and dispenses the payment upon receipt of the PIN code.

The system utilizes request translation software that is capable of translating a payment request received in the native format of the P2P server into multiple native formats for a plurality of disparate ATM control servers, thereby creating a bridge between the P2P system and a plurality of disparate ATM systems. Optionally, one of the native ATM control server formats supported by the request translation software is the Z-Cash format.

The ATM receives the payment instructions from the ATM control sever and generates and transmits a response indicating that the instructions have been received. The cash payment server executes request translation software operative to receive a response from the ATM control server that the ATM has received the payment instructions. It is further operative to convert or translate and transmit the response into the native format utilized by the computer system. The response, transmitted across the computer network to the payee computing device, may contain the PIN code used to access the funds. Alternatively, the PIN code is transmitted to the payor computing device and communicated to the payee via any transmission method known to those skilled in the art, for example, via telephone or email. The payee supplies the PIN code to the ATM containing the payment instructions, causing the currency to be dispensed.

The method disclosed herein comprises transmitting a payment request from a payor computing device over the computer network to a P2P server, which receives and processes the payment request by debiting a financial instrument specified by the user of the payor computing device. The payor computing device and the P2P server communicate according to a native format of the P2P server. The method further comprises executing request translation software on a cash payment server for receiving the payment request and translating the request into a native format of an ATM control server, the ATM control server operative to generate and transmit payment instructions and a PIN code to a designated ATM terminal. The method also includes receiving the payment instructions at an ATM to dispense the payment upon receipt of the PIN code. The ATM control sever may transmit the payment instructions from the ATM control server to the ATM.

Other features of the method of operation include translating the payment request into the native format of one of multiple native formats for a plurality of disparate ATM control servers. Optionally, one of the multiple native formats included in the translating step is the Z-Cash format.

The method further includes generating a response for transmission at the ATM that the payment instructions have been received. The response that the payment instructions have been received is received at the ATM control server from the ATM, and converted into a format that is native to the P2P server, optionally by the request translation software. The converted response is transmitted to the P2P server. The P2P server is capable of transmitting the response to a payee computing device, which optionally includes the PIN code required to access the payment. Alternatively, the PIN code is transmitted to the payor computing device and communicated to the payee via any transmission method known to those skilled in the art, for example, via telephone or email. The ATM dispenses the amount specified by the payment instructions in response to the payee supplying the PIN code.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
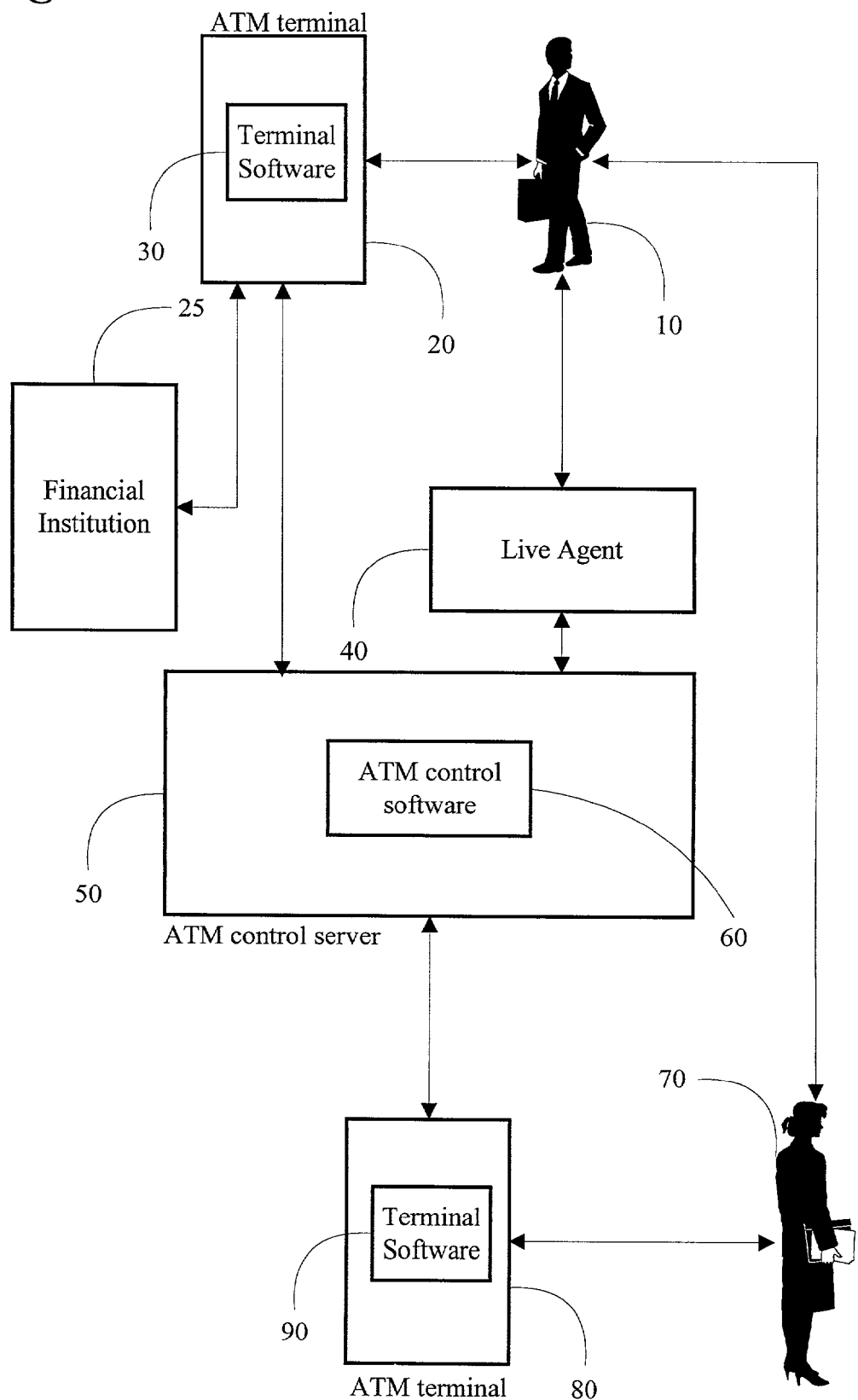
FIG. 1 is a block diagram presenting a current system for executing cash payments using an ATM system.
Figure 1A:
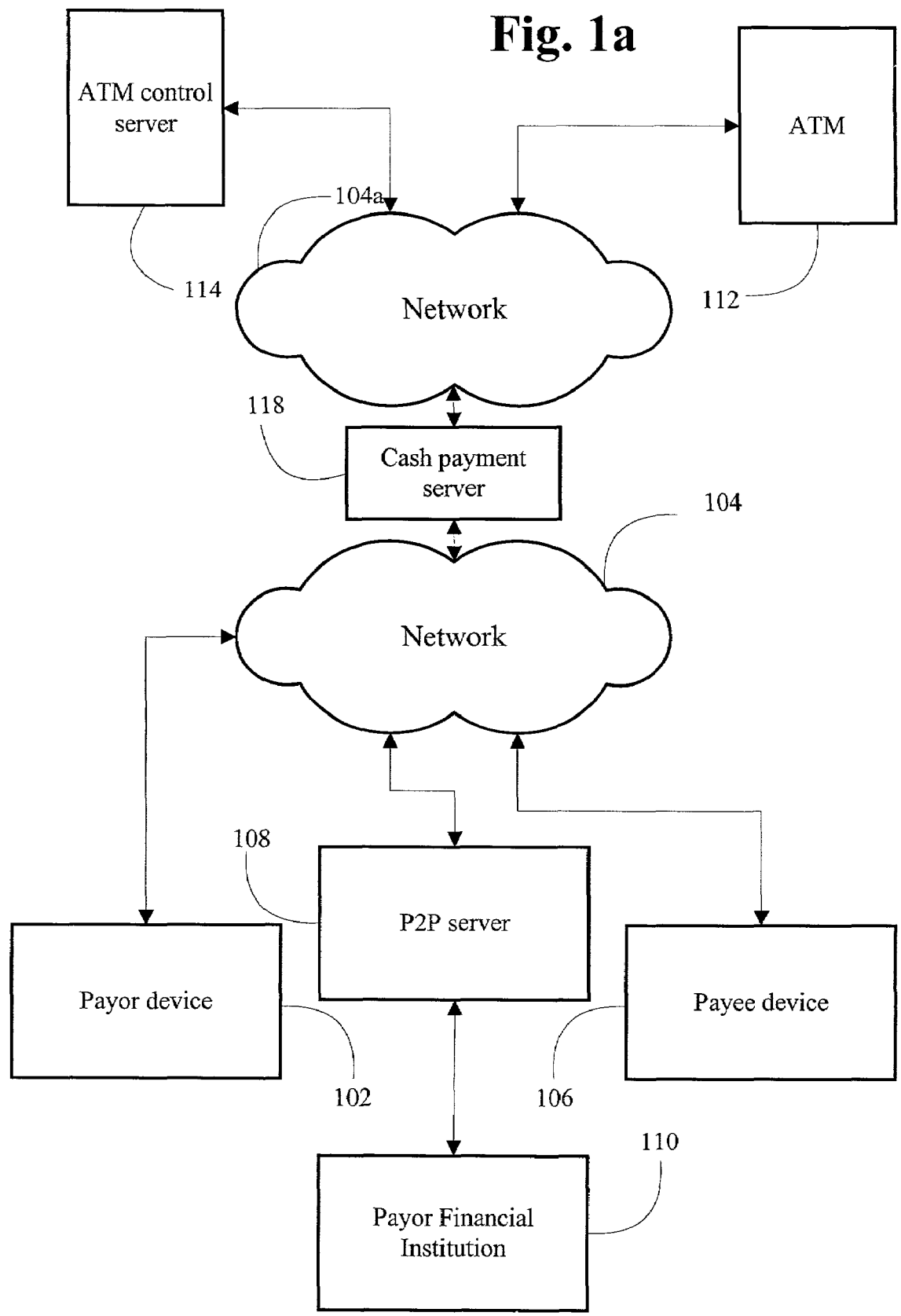
FIG. 1a is a high-level block diagram presenting an overview of the interaction of hardware components according to one embodiment of the present invention.

Embodiments of the present invention are now described with reference to the drawings in FIGS. 1a through 6. With reference to FIG. 1a, a high-level configuration of a system in accordance with the present invention includes various hardware and software components, including a payor device 102, a payee device 106, a P2P server 108, a cash payment server 118, an Automated Teller Machine ("ATM") control server 114, and one or more ATMs 112. Payor and payee devices, 102 and 106 respectively, may be any general purpose computing devices with the capacity to access a data network 104 including, but not limited to, personal computers, wireless computing devices, and personal digital assistants. The data network 104 used to facilitate communication between the hardware and software components of the invention may be any type of network capable of carrying data, such as the Internet, Intranets, LANs, WANs, fixed wireless networks, etc. Furthermore, the data network may be comprised of a plurality of disparate networks and network types.

Payor 102 and payee 106 devices communicate with a P2P server 108 via the network 104. Using the P2P system under the control of the P2P server 108, a variety of services can be offered, for example, the buying and selling of any number of goods and services. In addition to facilitating these transactions, the P2P server 108 is operative to control the transfer of funds in satisfaction of these transactions. Using the payor device 102, the payor initiates a payment transaction with the payee device 106 via the P2P server 108. The payor provides the financial parameters of the transaction, e.g., the financial instrument used in satisfaction of the transaction, the amount of the transaction, validation information uniquely and securely identifying the payor, etc. The P2P server can utilize any number of financial instruments, including, but not limited to, credit and debit cards, checking and savings accounts, money market accounts, smart cards, and stored value cards.

The financial parameters of the transaction are transmitted by the payor device 102 in the native data format of the P2P server 108. Upon receipt, the financial parameters are parsed and the payor's financial institution 110 validates the transaction. According to one embodiment, the financial institution uses a network that is distinct from the network carrying communications between the payor device 102 and the P2P server 108, although the payor financial institution 110 could also communicate with the P2P server 108 over a common network. Notification regarding the approval or denial of the transaction is returned to the P2P server 108, which generates payment request that is transmitted to a cash payment server 118.

The payment request is received by the cash payment server 118 in the native data format of the P2P sever 108. The cash payment server 118 transforms the received payment request into a payment request that is properly formatted for action by an ATM control sever 114 and transmitted across an ATM network 104a. The ATM control sever 114 is operative to control one or more remotely located ATM terminals 112. According to one embodiment of the invention, the ATM network requires communications formatted according to the Z-Cash standard. The ATM control server 114 also generates a PIN code to access the payment and payment instructions for the ATM.

The payment instructions are transmitted to an ATM 112 specified by the payor 102 and notification returned stating that the transfer was successful. The ATM control server 114 generates a response or receipt indicating that 1) the payment instructions have been successfully transmitted to and received by the ATM 112, and 2) the PIN code associated with the transaction. Alternatively, additional information can be included in the response, for example, the payor name, a receiving institution identifier, the transaction amount, any transaction fees levied by either the P2P server 108 or the ATM control server 114, the transaction type, and any other transaction related information.

The response, in the native data format of the ATM control server 114, is transmitted across the network 104*a*, received by the cash payment server 118 and translated into the native data format of the P2P server 108. The translated receipt is received and parsed by the P2P server 108. Information in the receipt relevant to the payee, e.g., PIN code, ATM location, and amount of payment, are transmitted from the P2P server, via the network 104, to the payee device 106. Information in the receipt relevant to the payor is transmitted to the payor device 102. The payee uses the information contained in the receipt to interface with the designated ATM 112 to retrieve the cash payment. Alternatively, the PIN code is transmitted to the payor, who communicates it to the payee according to methods well known to those skilled in the art, e.g., telephone or e-mail.

Figure 2:
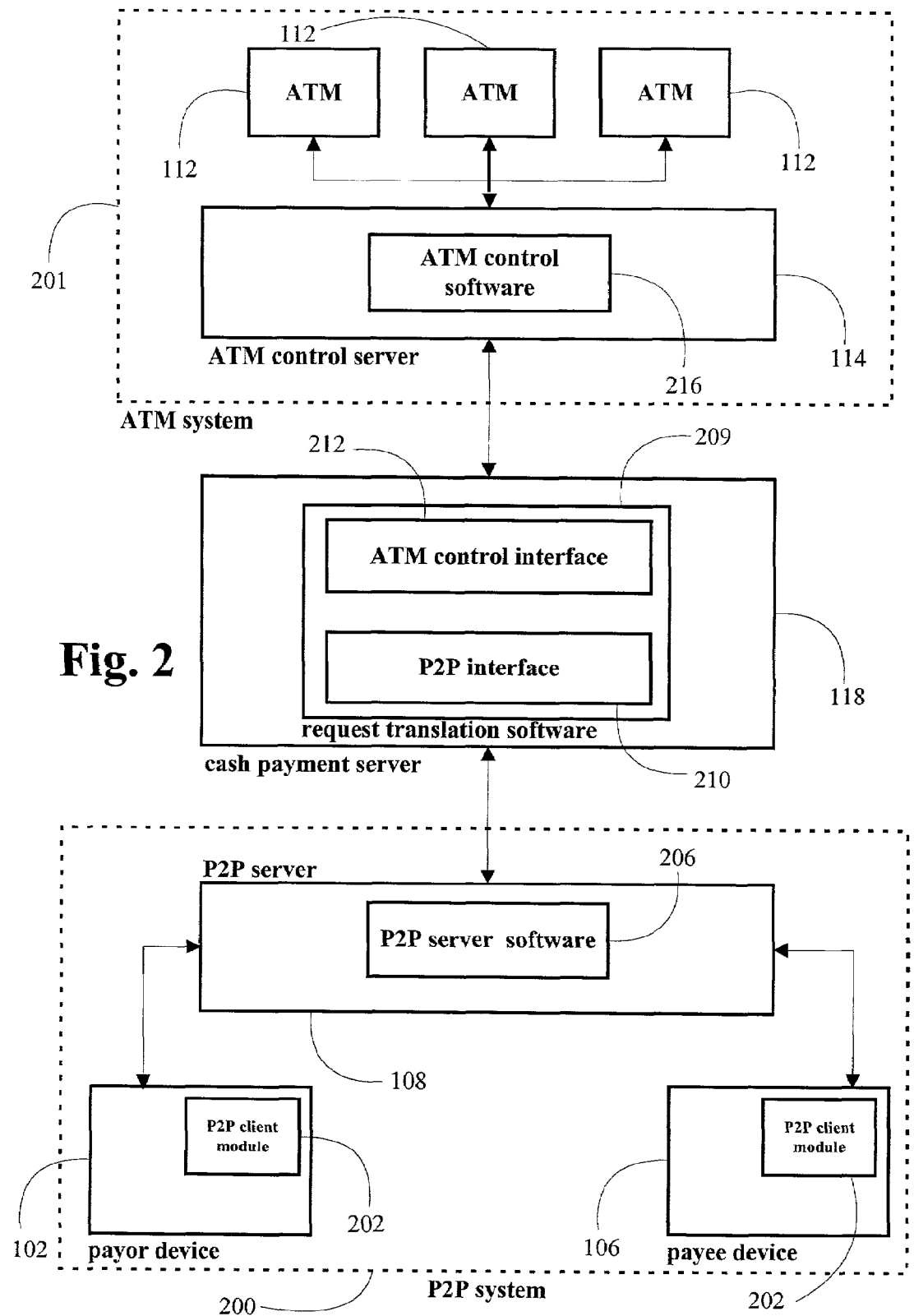
FIG. 2 is a block diagram presenting a detailed view of the interaction of hardware and software components according to one embodiment of the present invention.

FIG. 2 is a block diagram presenting a detailed view of the hardware and software components previously presented. The P2P server 108 stores and executes P2P server software 206. The P2P server software 206 is used to bring parties together, e.g., a payor and payee utilizing a payor device 102 and payee device 106, to conduct transactions. For example, the P2P server software 206 may facilitate matching buyers and sellers of antique goods. Alternatively, the P2P system is configured to only handle payment transactions in conjunction with a sale or auction system. Indeed, the P2P server software 206 is capable of being configured to facilitate the buying and selling of virtually any type of good or service. The P2P server software 206 is further operative to handle the transfer of funds in satisfaction of the sale of a good or service. The software 206 debits a financial instrument specified by the payor and transfers the funds to the payee. The transfer of funds effected by the software 206 includes, but is not limited to, debiting a smart card, stored value card, checking account, savings account, or cash payment.

In the P2P system 200, a buyer or payor utilizes a P2P client module 202 executing on the payor device 102 to interface with the P2P server software 206 executing on the P2P server 108. In this manner, the payor, through use of the payor device 102 and P2P client module 202, is capable of finding other parties selling desired goods and services. A seller or payee also utilizes a P2P client module 202 executing on the payee device 106 to interface with the P2P server software 206 executing on the P2P server 108. In this manner, the payee, through the use of the payee device 106 and P2P client module 202, is capable of presenting goods or services that he or she is offering for sale.

The P2P client module 202 may be a stand-alone executable application, a component integrated into the operating system or other system software on the payor device, or a software component utilized by another executable application. The payor uses the P2P client module 202 to set up a cash payment that is transmitted to the P2P server software 206. The P2P server validates the transaction with the payor's financial institution (FIG. 1, reference 110) and transmits the payment request to the cash payment server 118. The payment request may include, for example, the specific id or address of an ATM control server, a transaction type code, the transaction amount, any transaction fees, the name or other unique identifier of the recipient, and a data code indicating the terminal type that is the ultimate destination for the payment request, e.g., a Z-Cash terminal. According to some embodiments, the P2P server receives the request and notifies the payee, who is provided with the option to choose the location of the destination ATM terminal.

The cash payment server 118 acts as a bridge or gateway between the P2P system 200 and an ATM system 201. The request translation software 209 uses the P2P interface 210, which is capable of interpreting the payment request and other data in the native format of the P2P system 200. The request translation software 209 is operative to translate a payment request received over the P2P interface 210 in the native format of the P2P system 200 into a payment request according to the native format of the ATM system 201. The translated payment request is passed to an ATM control interface 212, which is capable of interpreting the payment request and other data in the native format of the ATM system 201. The ATM control interface 212 is used to transmit the translated payment request to an ATM control server 114.

The ATM control server 114 receives the payment request from the request translation software's 209 ATM control interface 212, which is processed by the ATM control server software 216. The ATM control server software 216 is operative to instruct individual ATM terminals as to the dispensing of currency and the parameters therefor. The ATM control software 216 generates a PIN code for the transaction. The ATM control software 216 also selects an ATM terminal 112 to dispense the currency and passes it the PIN code, a transaction type code, the transaction amount, any transaction fees, and a unique identifier for the payee. Alternatively, an ATM terminal 112 selected to dispense the currency may be defined by the payor through the P2P client module 202 and included in the payment request transmitted from the P2P system 200 to the ATM system 201. Optionally, the PIN code or other parts of the payment request passed to or from the ATM 112 may be encrypted using tools well known to those skilled in the art. Upon conclusion of the transmission, the ATM 112 responds to the ATM control sever 114 either indicating that the data was successfully received or that data items need to be retransmitted.

The ATM control server 114 generates a response or receipt indicating that the transaction was successfully delivered to the ATM 112 and the PIN code required to access the currency. This receipt is transmitted to the cash payment server 118 in the native format of the ATM system 201. The request translation software 209 and its associated interfaces, 210 and 212, translate the receipt into the native format of the P2P system 200 and transmit it to the P2P server 108.

Because the receipt contains information relevant to both the payor and the payee, the P2P server software 206 parses the receipt and generates individual messages for the payor and payee devices, 102 and 106 respectively. For example, the message generated for transmission to the payor device comprises, but is not limited to, the transaction type, the transaction amount, any transaction fees assessed, and the payor identifier. The P2P server may also utilize debit information returned from the payor's financial institution (FIG. 1, reference 110), for example, the identifier for the account or instrument that was used to fund the transaction. Messages generated and transmitted to the payee device 106 may include the location or location code for the ATM terminal 112, the transaction amount, and the PIN code used to access the currency. The payee is free to access the identified ATM terminal 112, enter the PIN code, and retrieve the currency in satisfaction of the transaction.

According to alternative embodiments of the system, a payor generates a cash payment request using a P2P client module 202 executing on a payor computing device 102. As with other embodiments, the P2P server software 206 receives the request and validates the transaction with the payor's financial institution. The P2P server software 206 transmits a message to the payee computing device indicating that a payment request has been received. The payee is provided an opportunity to determine the PIN code and location of the ATM terminal that is the destination of the cash payment. The destination ATM selected by the payee is added to the payment request and transmitted to the destination ATM terminal as previously described. According to other embodiments, the cash payment generated by the payor is available for retrieval from any authorized ATM location. The payment request is generated by the payor, validated by the P2P server and translated by the request translation software at the cash payment server. The translated request is forwarded and stored by the ATM control server. The payee travels to any authorized ATM location and accesses the ATM providing the PIN code and any other required validation information. The ATM terminal authenticates the provided information with the payment information stored at the ATM control server. Where the information is validated, the payment request is transmitted to the ATM terminal, which instructs the terminal to dispense the indicated amount. In this manner, the payee is free to use any convenient authorized ATM terminal to collect the cash payment.

Figure 3:
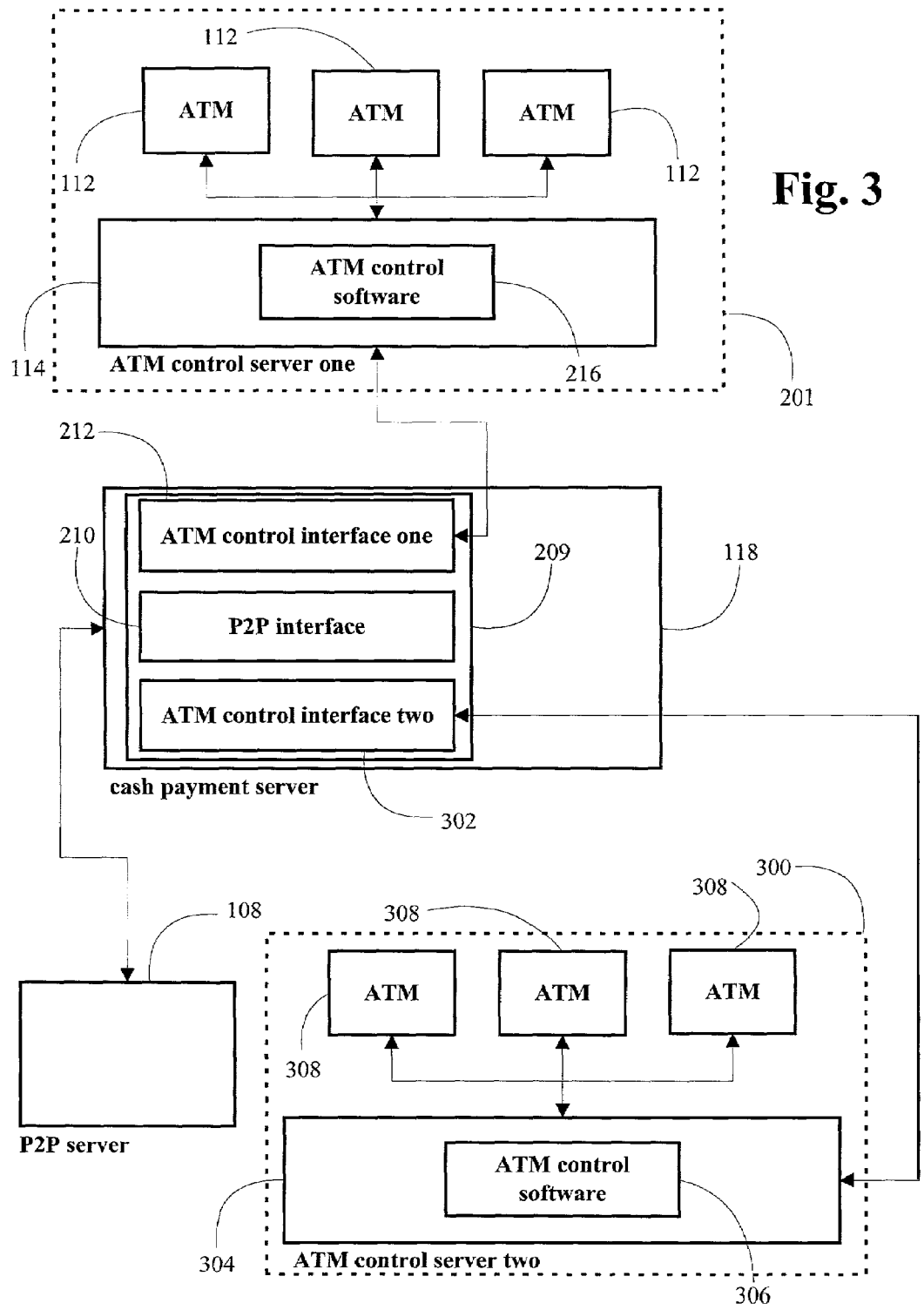
FIG. 3 is a block diagram presenting a detailed view of the interaction of the hardware and software components according to an alternative embodiment of the present invention.

FIG. 3 presents a block diagram that builds on the system presented in FIG. 2 by adding support for multiple ATM systems, 201 and 300. At the time the payor makes a payment request, he or she is optionally permitted to indicate the particular ATM terminal, 112 and 308, used to dispense the payment. This terminal data is included in the payment request along with, as indicated above, a data code indicating the terminal type, e.g., ATM system that is the ultimate destination for the payment request.

The payment request is transmitted to the cash payment server 118, where it is passed to the request translation software 209 via its P2P interface 210 for translation. Because this is a heterogeneous computing environment comprising multiple ATM control server types, 114 and 304, each processing payment requests according to a disparate format, the proper ATM control interface, 212 and 302, is selected according to the terminal type data code contained in the payment request. The request translation software 209 processes the terminal type data block of the payment request and determines which interface is a match. This processing may be executed in a parallel or serial manner. Where a match is found, the interface translates the message into the native format of the ATM system it is programmed for. Once the appropriate interface is determined, processing is completed as previously described.

Figure 4:
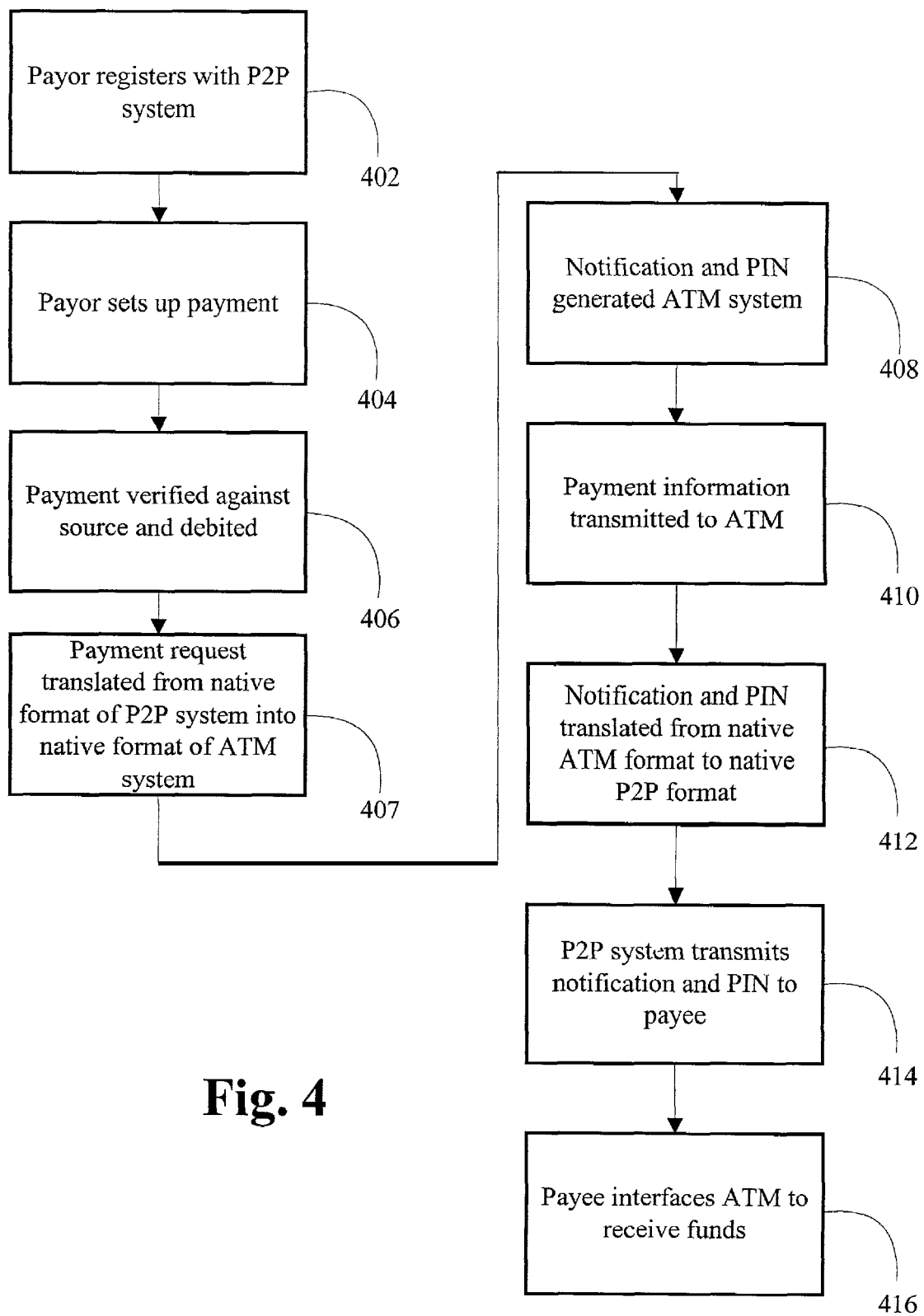
FIG. 4 is a flow diagram presenting a high-level overview of the process of utilizing the invention to transmit a cash payment over a computer network according to one embodiment of the present invention.

FIG. 4 presents a high-level flow diagram presenting a method of operating embodiments of the system presented in FIGS. 1*a* through 3. A buyer or payor accesses a P2P system through the use of P2P client software and generates an account with the system, step 402. The account registration procedure includes, but is not limited to, collecting personal information regarding the payor and the funds source used to make payments for purchases. The funds source may be, for example, a smart card, a stored value card, a checking or savings account, credit card, or debit card.

Using the P2P system, the payor selects goods and services for purchase and sets up a payment, step 404. The P2P system uses the funds source information provided by the payor at the time of registration, step 402, to debit the amount of the transaction from the funds source, step 406. The payment request is then translated from the native format of the P2P system into the native format of the ATM system, step 407. The ATM system generates a PIN code and notification message for eventual transmission to the payee, step 408. The ATM system also transmits a payment instruction and PIN code to an ATM, step 410, enabling the ATM to dispense the amount of currency contained in the payment instruction when the associated PIN is entered into the ATM.

The notification and PIN code generated in step 408 are translated from the native format of the ATM system into the native format of the P2P system, step 412. The P2P system delivers the notification and PIN code to the payee device, step 414, instructing the payee as to the location of the ATM instructed to dispense the currency for payment. The payee travels to the location of the ATM and supplies the received PIN code, step 416, which causes the ATM to dispense the funds.

Figure 5:
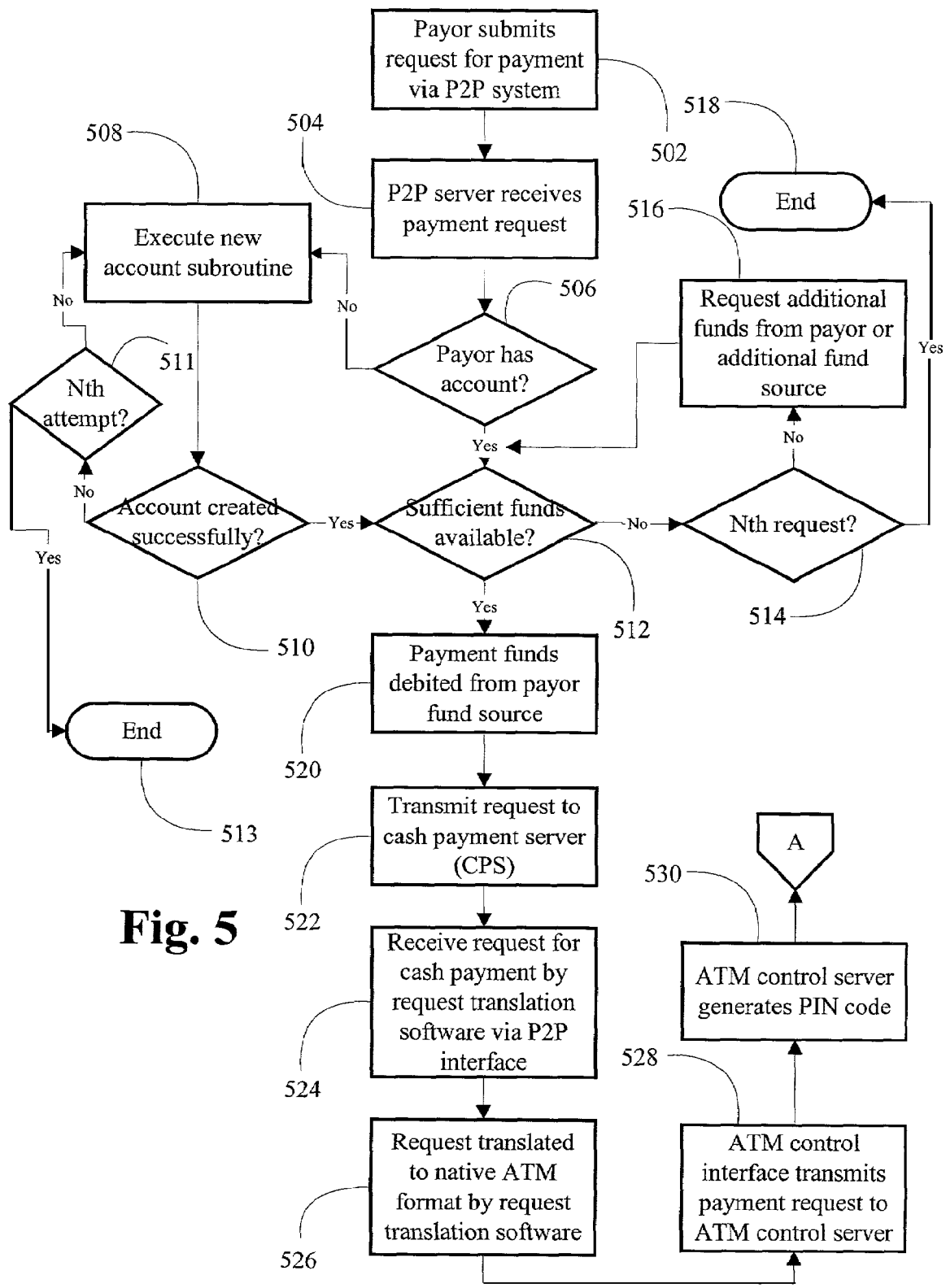
FIG. 5 is a flow diagram presenting a detailed view of the process of utilizing the invention to execute a cash payment over a computer network according to one embodiment of the present invention.

FIG. 5 is a detailed flow diagram of the method of operation presented in FIG. 4. Using a computing device as previously described, the payor submits a request for payment via the P2P system, step 502. The request is received by the P2P server and processed by the P2P server software, step 504. P2P server software performs a check to determine if the payor has an account with the system by searching account records, step 506. Where the check fails to uncover a payor account, step 506, the P2P server software executes a new account subroutine that involves the payor answering a series of questions regarding personal information and fund source information, the fund source information used to fund transactions executed through the P2P system, step 508.

When the new account subroutine ends, another check is performed to determine if the subroutine exited properly and all account information was collected, step 510. If the check fails, a third check is performed to determine if a predetermined threshold has been passed, step 511. Where the threshold has not been exceeded, step 511, another iteration of the loop is executed, steps 508, 510, and 511. If the threshold has been exceeded, step 511, the process ends and the payment request is abandoned, step 513.

Where the P2P server software determines that the payor has an account with the system, step 506, a check is performed to determine if the payor has sufficient funds available in the designated funds source to fulfill the payment request, step 512. If sufficient funds are unavailable, step 512, a check is performed to determine if a predetermined threshold has been passed, step 514. Where the threshold has not been exceeded, the software generates a request for the payor to provide additional funds or additional fund sources in order to fund the payment request, step 516. The loop is reiterated until either the threshold is exceeded, step 514, causing the routine to exit and abandon the request, step 518, or there are sufficient funds available to cover the payment request, step 512.

Once funds are available, the P2P server software debits the finds from the payor fund source, step 520. Optionally, the financial institution in possession of the fund source may return receipt information for the debit transaction that is transmitted to the payor via the P2P server. The payment request is transmitted across a network and received by a cash payment sever, step 522.

The payment request is passed to the request translation software, which processes the request via its P2P interface, step 524. The request translation software translates the request from a format native to the P2P system into a format native to the ATM system, step 526. The request translation software uses its ATM control interface to transmit the payment request to an ATM control server, which is also optionally included within the payment request and acted on by the interface, step 528. The ATM control server receives the payment request in its native format, and generates a PIN code to be used by the payee to retrieve the funds, step 530. The PIN code is a unique numeric or alphanumeric sequence that is randomly and uniquely generated using tools well known to those skilled in the art.

Figure 6:
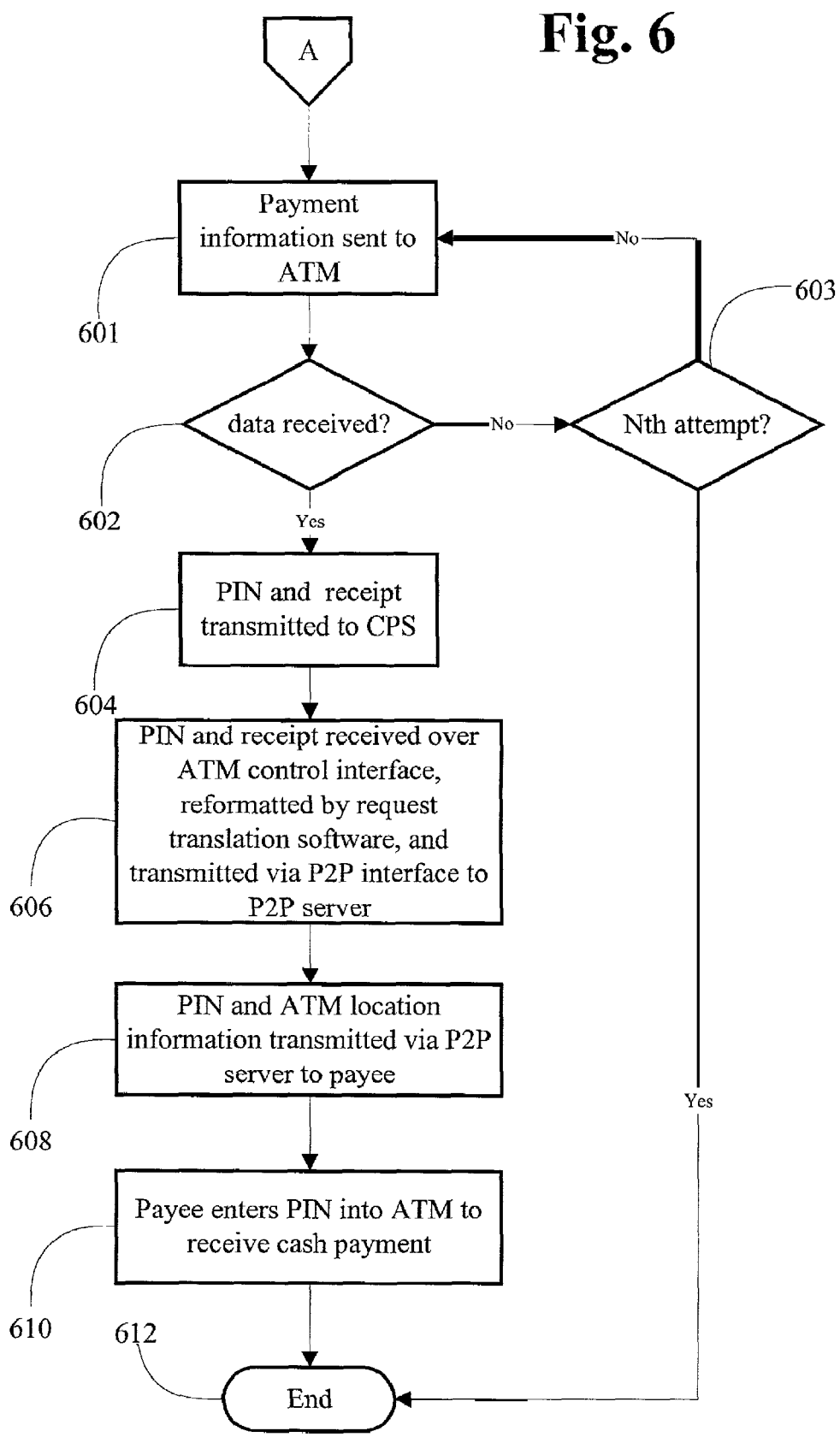
FIG. 6 is a flow diagram presenting a continuation of the detailed view of the process of utilizing the invention to execute a cash payment over a computer network according to one embodiment of the present invention.

Turning to FIG. 6, the detailed process flow presented in FIG. 5 continues with the ATM control server and associated software transmitting the payment instructions and PIN code to the ATM indicated in the payment request, step 601. The ATM control server waits for the ATM to generate a response indicating whether or not the payment information was received. A check is performed to determine the result of the transfer, step 602. A check is also preformed to determine if a predetermined threshold has been exceeded with regard to the number of transfer attempts, step 603. Where the threshold has not been exceeded, the ATM control server retransmits the payment information, step 601, and the loop is reiterated. If the threshold is exceeded, the routine terminates and the request is abandoned, step 612.

When the ATM terminal successfully receives the data, step 602, the PIN code and ATM transmission receipt is transmitted from the ATM control sever to the cash payment server, step 604. The request translation software executing on the cash payment server receives the PIN and receipt through the use of its ATM control interface, where it is reformatted by the request translation software into the native format of the P2P system and transmitted to the P2P server through the use of its P2P interface, step 606. At the P2P server, the PIN and ATM location information, extracted from the received receipt, are transmitted to the payee, step 608. Using the PIN and location information, the payee interfaces with the ATM terminal and supplies the valid PIN code, step 610, instructing the ATM to dispense the payment amount indicated in the payment instructions received from the ATM control sever in step 601. Once the currency has been dispensed, the routine ends, step 612.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system for executing a cash payment via a computer network, the system comprising:
   a peer to peer server operative to:
      receive a payment request from a payor computing device over the computer network, the payment request being associated with a transaction between the payor and a payee and including a data code indicating an automated teller machine control server native format, and
      debit a financial instrument associated with an account of the payor specified by a user of the payor computing device, wherein the payor computing device and the peer to peer server are in communication according to a native format of the peer to peer server; and
   a cash payment server operative to:
      receive the payment request from the peer to peer server,
      select the automated teller machine control server native format from a plurality of automated teller machine control server native formats based on the data code, wherein each automated teller machine control server native format defines an arrangement of data to enable communications between the cash payment server and a predetermined automated teller machine control server,
      translate the payment request into the automated teller machine control server native format, and
      transmit the payment request to an automated teller machine control server associated with the automated teller machine control server native format;
   the automated teller machine control server being operative to:
      generate payment instructions and a personal identification number code, and
      transmit the payment instructions and the personal identification number code to an automated teller machine to enable the automated teller machine to dispense the payment to the payee upon receipt of the personal identification number code by the payee in satisfaction of the transaction.

2. The system of claim 1 wherein the cash payment server is operative to translate the payment request into multiple native formats of a plurality of disparate automated teller machine control servers.

3. The system of claim 1 wherein the automated teller machine control server is operative to receive a first response generated by the automated teller machine indicating that the automated teller machine has received the payment instructions.

4. The system of claim 3 wherein the cash payment server is operative to:
   receive a second response from the automated teller machine control server, translate the second response into a native format of the peer to peer server, and
   transmit the second response to the peer to peer server.

5. The system of claim 4 wherein the peer to peer server is operative to transmit a third response to at least one of the payor computing device and a payee computing device.

6. The system of claim 5 wherein at least one of the first response, the second response and the third response comprises at least one of the payment instructions and the personal identification number code.

7. The system of claim 6 wherein the automated teller machine dispenses an amount specified by the payment instructions in response to the personal identification number code.

8. A method for executing a cash payment via a computer network, the method comprising the steps of:
   receiving, by a peer to peer server, a payment request from a payor computing device over the computer network, the payment request being associated with a transaction between the payor and a payee;
   processing, by the peer to peer server, the payment request by debiting a financial instrument associated with an account of the payor specified by a user of the payor computing device, wherein the payor computing device and the peer to peer server are in communication according to a native format of the peer to peer server;
   receiving, by cash payment server, the payment request, wherein the payment request includes a data code indicating a type of automated teller machine corresponding to an automated teller machine receiving the payment request;
   selecting the automated teller machine control server native format from a plurality of automated teller machine control server native formats based on the data code, wherein each automated teller control server native format defines an arrangement of data to enable communications between the cash payment server and a predetermined automated teller machine control server, translating, by the cash payment server, the payment request into a native format of an automated teller machine control server, transmitting, by the cash payment server, the payment request to the automated teller machine control server associated with the automated teller machine control server native format; and generating, by the automated teller machine control server, payment instructions and a personal identification number code and transmitting the payment instructions and the personal identification number code to enable the automated teller machine to dispense the payment to the payee upon receipt of the personal identification number code by the payee in satisfaction of the transaction.

9. The method of claim 8 further comprising the step of translating the payment request into multiple native formats of a plurality of disparate automated teller machine control servers.

10. The method of claim 8 further comprising the step of receiving, by the automated teller machine control server, a first response generated by the automated teller machine indicating that the automated teller machine has received the payment instructions.

11. The method of claim 10 further comprising the steps of:
receiving, by the cash payment server, a second response from the automated teller machine control server;
translating, by the cash payment server, the second response into a native format of the peer to peer server; and
transmitting, by the cash payment server, the second response to the peer to peer server.

12. The method of claim 11 further comprising the step of transmitting, by the peer to peer server, a third response to at least one of the payor computing device and a payee computing device.

13. The method of claim 12, wherein at least one of the first response, the second response and the third response comprises at least one of the payment instructions and the personal identification number code.

14. The method of claim 13 further comprising the step of the automated teller machine dispensing an amount specified by the payment instructions in response to the personal identification number code.

* * * * *